United States Patent
Kwon

(10) Patent No.: US 8,862,825 B2
(45) Date of Patent: Oct. 14, 2014

(54) PROCESSOR SUPPORTING COARSE-GRAINED ARRAY AND VLIW MODES

(75) Inventor: Kwon Taek Kwon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 317 days.

(21) Appl. No.: 13/067,732

(22) Filed: Jun. 22, 2011

(65) Prior Publication Data

US 2012/0079179 A1   Mar. 29, 2012

(30) Foreign Application Priority Data

Sep. 27, 2010   (KR) ................ 10-2010-0093307

(51) Int. Cl.
*G06F 12/00* (2006.01)
*G06F 15/16* (2006.01)
*G06F 15/76* (2006.01)

(52) U.S. Cl.
CPC .................... *G06F 15/16* (2013.01); *G06F 15/76* (2013.01)
USPC ..... 711/119; 711/132; 711/105; 711/E12.017

(58) Field of Classification Search
None
See application file for complete search history.

(56) References Cited

U.S. PATENT DOCUMENTS

| | | | |
|---|---|---|---|
| 7,461,210 B1 * | 12/2008 | Wentzlaff et al. | 711/135 |
| 2010/0164949 A1 * | 7/2010 | Min et al. | 345/419 |
| 2011/0113125 A1 * | 5/2011 | Bruna et al. | 709/220 |
| 2011/0131381 A1 * | 6/2011 | Kaplan | 711/141 |
| 2012/0054468 A1 * | 3/2012 | Egger et al. | 712/20 |

FOREIGN PATENT DOCUMENTS

| | | |
|---|---|---|
| JP | 2010-044731 | 2/2010 |
| KR | 10-2009-0027184 | 3/2009 |
| KR | 10-2009-0083596 | 8/2009 |
| KR | 10-2009-0118985 | 11/2009 |

OTHER PUBLICATIONS

Panda, Preeti Ranjan, Nikil D. Dutt, and Alexandru Nicolau. "On-chip vs. off-chip memory: the data partitioning problem in embedded processor-based systems." ACM Transactions on Design Automation of Electronic Systems (TODAES) 5.3 (2000): 682-704.*

Mei, Bingfeng, et al. "ADRES: An architecture with tightly coupled VLIW processor and coarse-grained reconfigurable matrix." Field Programmable Logic and Application. Springer Berlin Heidelberg, 2003. 61-70.*

(Continued)

*Primary Examiner* — Christian P Chace
*Assistant Examiner* — Brendan Lillis
(74) *Attorney, Agent, or Firm* — Staas & Halsey LLP

(57) ABSTRACT

A processor and an operating method are described. By diversifying an L1 memory being accessed, based on an execution mode of the processor, an operating performance of the processor may be enhanced. By disposing a local/stack section in a system dynamic random access memory (DRAM) located external to the processor, a size of a scratch pad memory may be reduced without deteriorating a performance. While a core of the processor is performing in a very long instruction word (VLIW) mode, the core may data-access a cache memory and thus, a bottleneck may not occur with respect to the scratch pad memory even though a memory access occurs with respect to the scratch pad memory by an external component.

13 Claims, 3 Drawing Sheets

(56) References Cited

OTHER PUBLICATIONS

Panda, Preeti Ranjan, Nikil D. Dutt, and Alexandru Nicolau. "Architectural exploration and optimization of local memory in embedded systems." System Synthesis, 1997. Proceedings., Tenth International Symposium on. IEEE, 1997.*

Panda, Preeti Ranjan, et al. "Power-efficient Memory and Cache." Power-efficient System Design. Springer US, 2010. 89-138.*

Udayakumaran, Sumesh, Angel Dominguez, and Rajeev Barua. "Dynamic allocation for scratch-pad memory using compile-time decisions." ACM Transactions on Embedded Computing Systems (TECS) 5.2 (2006): 472-511.*

B. Bougard et al., "A Coarse-Grained Array based Baseband Processor for 100Mbps+ Software Defined Radio", Design Automation and Test in Europe, Mar. 2008.*

European Search Report dated Feb. 23, 2012 issued in corresponding European Patent Application 11179435.0.

* cited by examiner

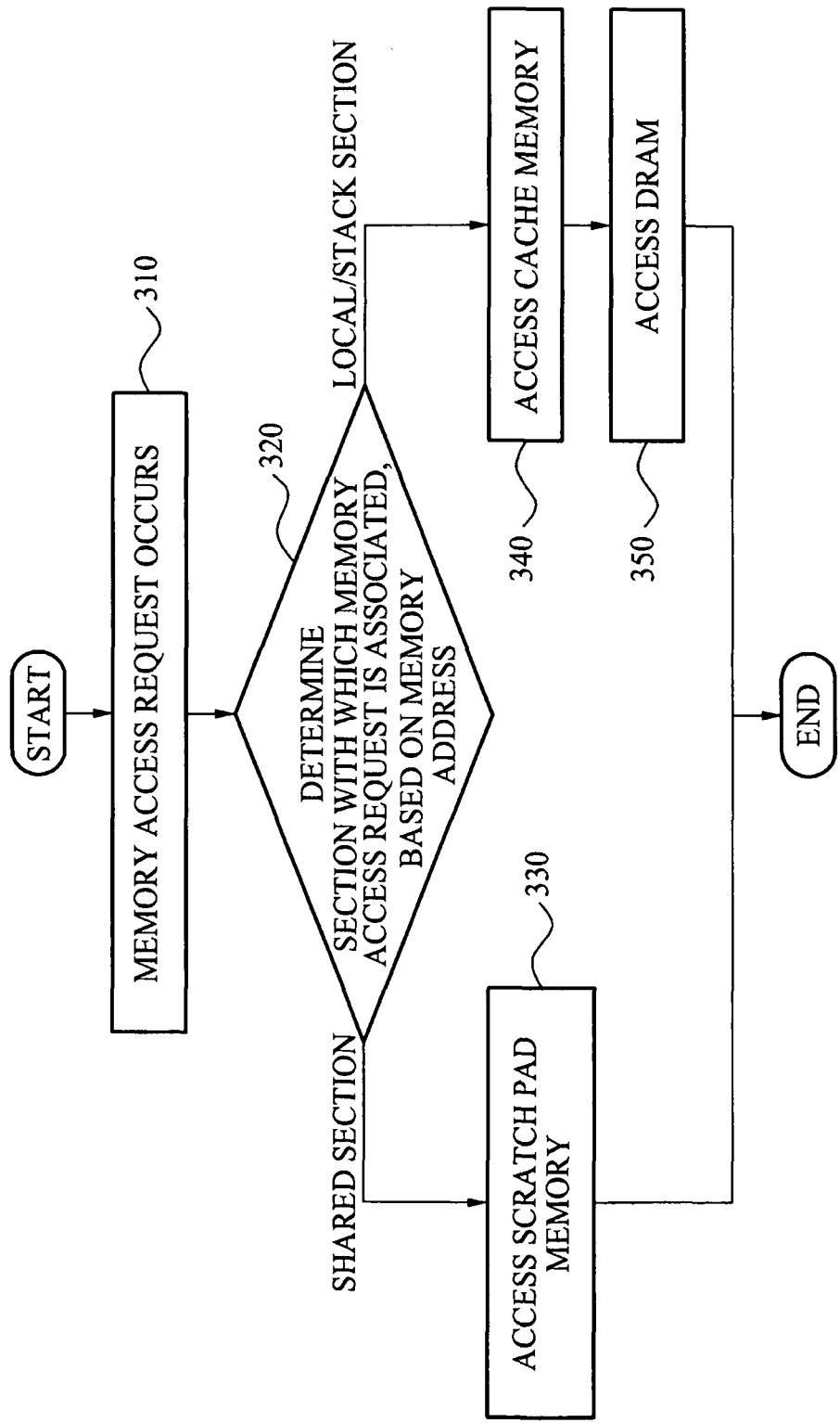

PROCESSOR SUPPORTING COARSE-GRAINED ARRAY AND VLIW MODES

CROSS-REFERENCE TO RELATED APPLICATIONS

This application claims the priority benefit of Korean Patent Application No. 10-2010-0093307, filed on Sep. 27, 2010, in the Korean Intellectual Property Office, the disclosure of which is incorporated herein by reference.

BACKGROUND

1. Field

One or more example embodiments of the present disclosure relate to a processor and an operating method of the processor, more particularly, a processor and an operating method of the processor supporting a coarse-grained array mode and a very long instruction word (VLIW) mode.

2. Description of the Related Art

Generally, in consideration of performance and cost, a data memory structure of a processor may be configured to incorporate an L1 memory having a small size and a relatively high speed within the processor, and to cause a memory having a larger size and a relatively low speed to use a source outside of (i.e., external to) the processor, such as a system dynamic random access memory (DRAM), and the like.

FIG. 1 illustrates a configuration of a processor 100 supporting a coarse-grained array mode and a very long instruction word (VLIW) mode according to conventional art.

Referring to FIG. 1, the processor 100 supporting the coarse-grained array mode and the VLIW mode according to the conventional art may include a core 110, a data memory controller 120, and a scratch pad memory 130.

The core 110 of the processor 100 according to the conventional art may have a structure disposing of a number of functional units (FUs) in a grid pattern, and may obtain enhanced performance by easily performing operations in parallel in the FUs through performing the coarse-grained array mode.

The processor 100 according to the conventional art may successively read a value in an input data array among software codes and perform an operation. When a reoccurring routine that is performed using a loop and that is in a form of using a result value in an output data array exists, the reoccurring routine may be processed through the coarse-grained array mode. Accordingly, a data memory access pattern in the coarse-grained array mode may usually correspond to a sequential access pattern. In a case of the sequential access pattern, a temporal/spatial locality may be low. Thus, when a cache memory is used as an L1 data memory, an area used for storage capacity may increase, a miss rate may increase, and a performance may deteriorate.

To enable the coarse-grained array mode to exhibit the best efficiency, the scratch pad memory 130 having a low area cost for unit capacity may be suitable for the data memory structure so that the input and output data array may be relatively large.

However, since the coarse-grained array mode may accelerate only a loop operation portion, a general routine other than the loop operation may be executed in the VLIW mode.

Since the VLIW mode may use only a portion of FUs among a plurality of FUs, performing the operation in parallel may result in poor performance. However, since the VLIW mode may perform a general software code, a function call, and the like in addition to the loop operation, the VLIW mode may be an essential function for the processor to fully execute a single software code.

Since a stack access, a global variable access, and the like may unrestrictedly occur during an execution of code in the VLIW mode, the data memory access pattern may have a relatively high temporal/spatial locality.

To enable the VLIW mode to exhibit the best efficiency, the cache memory, capable of enhancing performance using locality and reducing an external memory bandwidth, may be suitable for an L1 data memory structure.

The processor 100 according to a conventional art may include only the scratch pad memory 130 as the L1 memory. Thus, in the processor 100 according to a conventional art, both of a shared section in which a variable used in the coarse-grained array mode is stored and a local/stack section in which a variable used in the VLIW mode is stored may be included in the scratch pad memory 130. In this instance, the core 110 according to a conventional art may access the scratch pad memory 130 through the data memory controller 120 based on an execution mode to be executed, that is, one of the coarse-grained array mode and the VLIW mode.

Thus, in the processor 100 according to the conventional art, the core 110 may access the scratch pad memory 130 at all times regardless of the execution mode of the core 110. When external accesses simultaneously occur through a bus slave besides the core 110 with respect to the scratch pad memory 130, an execution performance of the scratch pad memory 130 may deteriorate.

SUMMARY

The foregoing and/or other aspects are achieved by providing a processor supporting a coarse-grained array mode and a very long instruction word (VLIW) mode, including a core of the processor, a scratch pad memory including a shared section in which a variable used in the coarse-grained array mode is stored, a cache memory to cache a variable used in the VLIW mode, from a dynamic random access memory (DRAM) including a local/stack section in which the variable used in the VLIW mode is stored, and an address decoding unit to determine which section a memory access request received from the core is associated with, of the shared section and the local/stack section, based on a memory address corresponding to the memory access request received from the core. In an embodiment, when the memory address corresponds to the shared section, the core accesses the scratch pad memory, and when the memory address corresponds to the local/stack section, the core accesses the cache memory.

The foregoing and/or other aspects are achieved by providing an operating method of a processor supporting a coarse-grained array mode and a VLIW mode, including receiving a memory access request from a core of the processor, and determining which section the memory access request received from the core is associated with, of a shared section and a local/stack section, based on a memory address corresponding to the memory access request received from the core. In an embodiment, the scratch pad memory is accessed when the memory address corresponds to the shared section and the cache memory is accessed when the memory address corresponds to the local/stack section.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 3 illustrates an operating method of a processor according to example embodiments.

DETAILED DESCRIPTION

Figure 1:
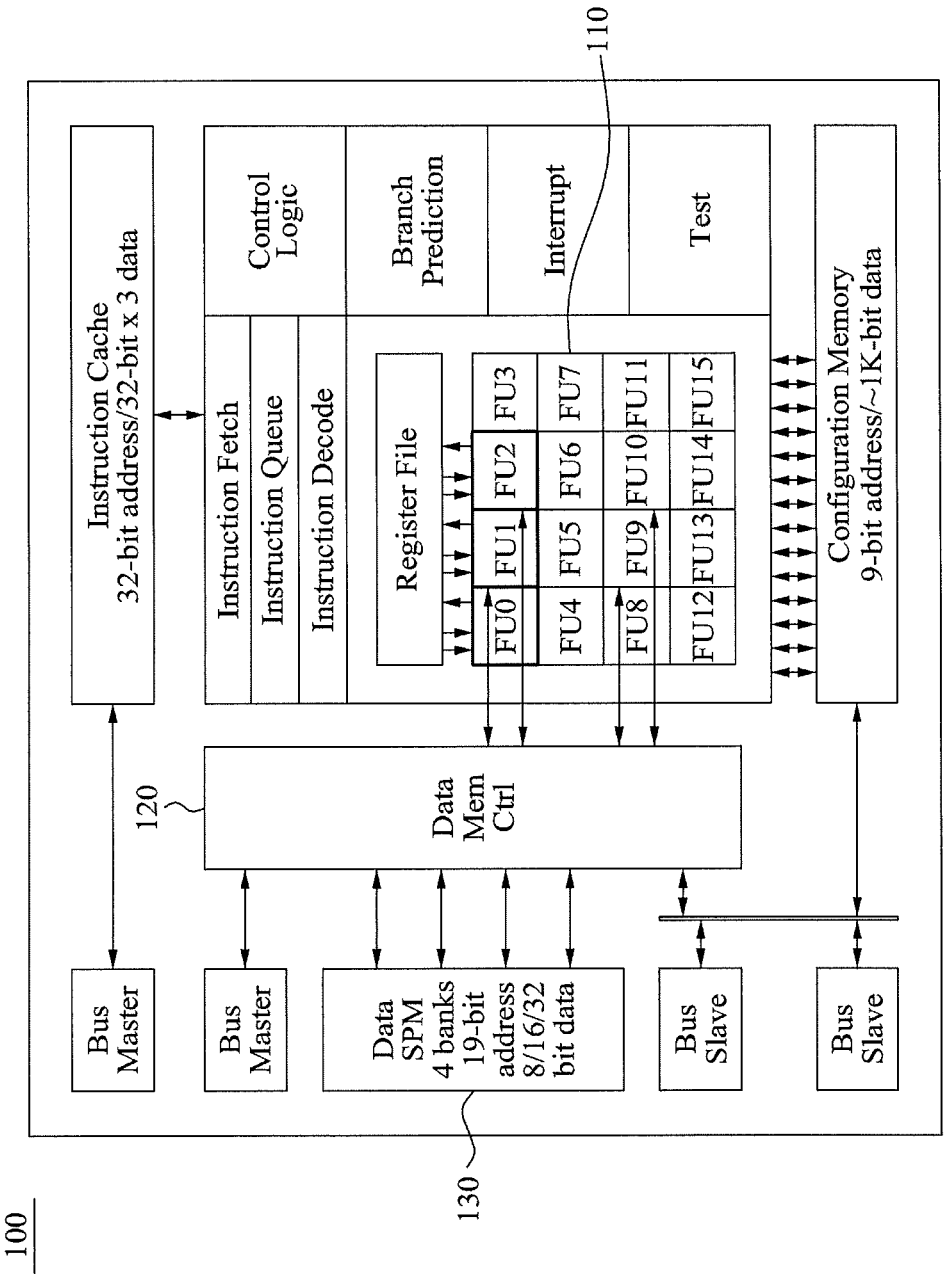
FIG. 1 illustrates a configuration of a processor supporting a coarse-grained array mode and a very long instruction word (VLIW) mode according to a conventional art.

Reference will now be made in detail to embodiments, examples of which are illustrated in the accompanying drawings, wherein like reference numerals refer to the like elements throughout. Embodiments are described below to explain the present disclosure by referring to the figures.

Figure 2:
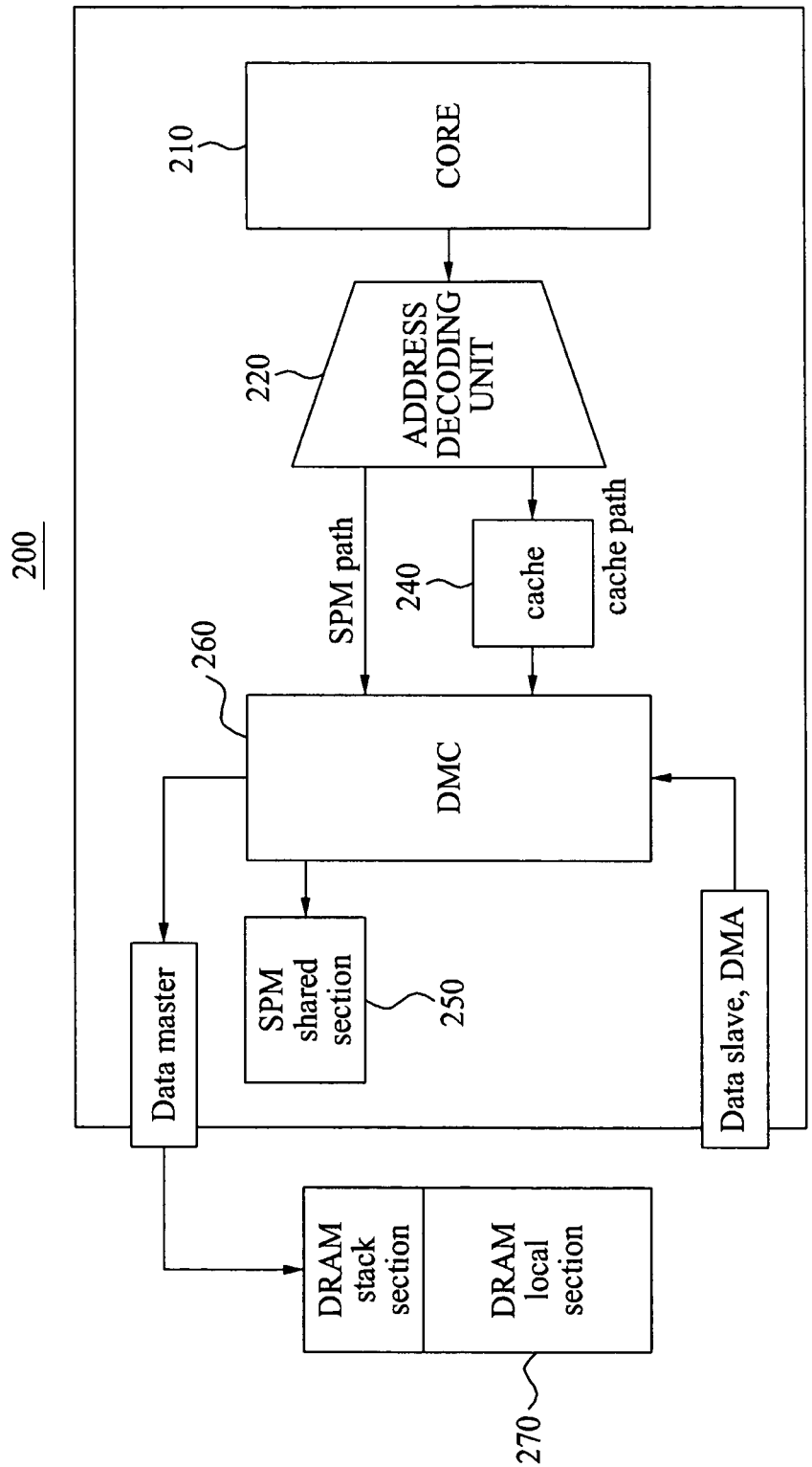
FIG. 2 illustrates a configuration of a processor according to example embodiments.

FIG. 2 illustrates a configuration of a processor 200 according to example embodiments.

Referring to FIG. 2, a processor 200 supporting a coarse-grained array mode and a very long instruction word (VLIW) mode according to example embodiments may include, for example, a core 210, an address decoding unit 220, a cache memory 240, and a scratch pad memory 250.

The cache memory 240 may cache a variable used in the VLIW mode, from a dynamic random access memory (DRAM) 270.

The DRAM 270, according to example embodiments, may include a local/stack section in which the variable used in the VLIW mode is stored. In this instance, the DRAM 270 according to example embodiments may be located external to the processor 200.

The scratch pad memory 250 may include a shared section in which a variable used in the coarse-grained array mode is stored.

According to an embodiment of the present disclosure when a programmer programs software and declares a global variable, the programmer may designate a data section, that is, the shared section or the local/stack section, as the section in which the global variable is located. For example, the programmer may declare that the variable used in the coarse-grained array mode is located in the shared section, and the variable used in the VLIW mode is located in the local/stack section.

A compiler may separately dispose the global variable in a predetermined address section for each data section in response to the declaration of the location.

Accordingly, the variable used in the coarse-grained array mode according to example embodiments may be disposed in a first memory address section set in response to the shared section. The variable used in the VLIW mode may be disposed in a second memory address set in response to the local/stack section.

For example, when an address range of 1 through 100 is set in response to the local/stack section, the compiler may separately dispose the global variable, declared to be located in the local/stack section, in the address range of 1 through 100. When an address range of 101 through 200 are set in response to the shared section, the compiler may separately dispose the global variable, declared to be located in the shared section, in one of the addresses in the address range of 101 through 200.

In this instance, when a memory access request occurs from the core 210, the address decoding unit 220 may determine which of the shared section and the local/stack section the memory access request is associated with, based on a memory address corresponding to the memory access request.

For example, when the memory address of the memory access request corresponds to a memory address of the shared section, the address decoding unit 220 may determine that the memory access request is a memory access request associated with the shared section. In this instance, the core 210 may access the scratch pad memory 250 including the shared section.

When the memory address of the memory access request corresponds to a memory address of the local/stack section, the address decoding unit 220 may determine that the memory access request is a memory access request associated with the local/stack section. In this instance, the core 210 may access the cache memory 240. When a cache miss occurs as a result of an access to the cache memory 240, the core 210 may access the DRAM 270 including the local/stack section.

According to an embodiment of the present disclosure, the processor 200 may further include a data memory controller 260.

The data memory controller 260 may control a memory access of the core 210.

Depending on embodiments, when the memory access request of the core 210 is determined to be the memory access request with respect to the shared section, the core 210 may access the scratch pad memory 250 through the data memory controller 260.

When the memory access request of the core 210 is determined to be the memory access request with respect to the local/stack section, and as a result of the access to the cache memory 240 of the core 210 the cache miss occurs, the core 210 may access the DRAM 270 through the data memory controller 260.

When a memory access request with respect to an external section occurs from the core 210, the core 210 may memory-access the external section through the data memory controller 260.

The data memory controller, 260 according to an embodiment, may be connected to the core 210. The cache memory 240, according to an embodiment, may be connected to each of the data memory controller 260 and the address decoding unit 220.

FIG. 3 illustrates an operating method of a processor according to example embodiments.

According to an embodiment of the present disclosure, when a programmer programs software and declares a global variable, the programmer may designate a data section, that is, the shared section or the local/stack section, as the section in which the global variable is located. For example, the programmer may declare that the variable used in the coarse-grained array mode is located in the shared section, and the variable used in the VLIW mode is located in the local/stack section.

A compiler may separately dispose the global variable in a predetermined address section for each data section in response to the declaration of the location.

Accordingly, the variable used in the coarse-grained array mode according to example embodiments may be disposed in a first memory address section set in response to the shared section. The variable used in the VLIW mode may be disposed in a second memory address section set in response to the local/stack section.

For example, when an address range of 1 through 100 is set in response to the local/stack section, the compiler may separately dispose the global variable, declared to be located in the local/stack section, in the address range of 1 through 100. When an address range of 101 through 200 is set in response to the shared section, the compiler may separately dispose the global variable, declared to be located in the shared section, in the address range of 101 through 200.

In the operating method of the processor supporting the coarse-grained array mode and the VLIW mode, in operation 310, a core of the processor may generate a memory access request.

In operation 320, one of the shared section and the local/stack section is determined to be associated with the memory access request, based on a memory address corresponding to the memory access request.

When the memory address of the memory access request corresponds to a memory address of the shared section, the operating method may determine that the memory access request is a memory access request associated with the shared section. In operation 330, the operating method may access a scratch pad memory including the shared section.

The scratch pad memory, according to an embodiment, may include the shared section in which a variable used in the coarse-grained array mode is stored.

When the memory address of the memory access request corresponds to a memory address of the local/stack section, the operating method may determine that the memory access request is a memory access request associated with the local/stack section. In operation 340, the operating method may access a cache memory.

The cache memory may cache a variable used in the VLIW mode, from a DRAM.

The DRAM according to an embodiment may include the local/stack section in which the variable used in the VLIW mode is stored. In this instance, the DRAM according to an embodiment may be located external to a processor.

When a cache miss occurs as a result of an access to the cache memory, the operating method may access the DRAM including the local/stack section in operation 350.

The operating method of the processor according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the processor supporting a coarse-grained array mode and a very long instruction word (VLIW) mode described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A processor supporting a coarse-grained array mode and a very long instruction word (VLIW) mode, comprising:
   a core of the processor;
   a scratch pad memory including a shared section in which a variable used in the coarse-grained array mode is stored;
   a cache memory to cache a variable used in the VLIW mode from a dynamic random access memory (DRAM) including a local/stack section in which the variable used in the VLIW mode is stored; and
   an address decoding unit to determine which section a memory access request received from the core is associated with, of the shared section and the local/stack section, based on a memory address corresponding to the memory access request received from the core,
   wherein the scratch pad memory and the cache memory are distinct hardware components within the processor, and
   wherein the scratch pad memory is not accessed in the VLIW mode.

2. The processor of claim 1, wherein:
   the variable used in the coarse-grained array mode is disposed in a first memory address section set in response to the shared section, and
   the variable used in the VLIW mode is disposed in a second memory address section set in response to the local/stack section.

3. The processor of claim 1, further comprising:
   a data memory controller to control a memory access of the core.

4. The processor of claim 3, wherein:
   the address decoding unit is connected to the core, and
   the cache memory is connected to each of the data memory controller and the address decoding unit.

5. The processor of claim 1, wherein, when a cache miss occurs as a result of an access to the cache memory, the core accesses the DRAM.

6. The processor of claim 1, wherein the DRAM is located external to the processor.

7. The processor of claim 1, wherein the core accesses the scratch pad memory when the memory address corresponds to the shared section and the core accesses the cache memory when the memory address corresponds to the local/stack section.

8. An operating method of a processor supporting a coarse-grained array mode and a very long instruction word (VLIW) mode, comprising:
   receiving a memory access request from a core of the processor; and
   determining which section the memory access request received from the core is associated with, of a shared section and a local/stack section, based on a memory address corresponding to the memory access request received from the core, wherein
   the shared section stores a variable used in the coarse-grained array mode,
   the local/stack section stores a variable used in the VLIW mode,
   the shared section and the local/stack section are distinct hardware components within the processor, and
   the scratch pad memory is not accessed in the VLIW mode.

9. The operating method of claim 8, wherein:
the variable used in the coarse-grained array mode is disposed in a first memory address section set in response to the shared section, and
the variable used in the VLIW mode is disposed in a second memory address section set in response to the local/stack section.

10. The operating method of claim 8, wherein:
a scratch pad memory includes the shared section, and
a cache memory caches the variable used in the VLIW mode, from a dynamic random access memory (DRAM) including the local/stack section.

11. The operating method of claim 10, further comprising:
accessing the DRAM when a cache miss occurs as a result of an access to the cache memory.

12. The operating method of claim 8, wherein a scratch pad memory is accessed when the memory address corresponds to the shared section and a cache memory is accessed when the memory address corresponds to the local/stack section.

13. A non-transitory computer-readable medium comprising a program for instructing a computer to perform the operating method of claim 8.

* * * * *